United States Patent [19]

Matty

[11] Patent Number: 5,051,935
[45] Date of Patent: Sep. 24, 1991

[54] DRAG RACE ANALYZER

[76] Inventor: Richard D. Matty, 16078 Fulton Rd., Marshallville, Ohio 44645

[21] Appl. No.: 356,845

[22] Filed: May 25, 1989

[51] Int. Cl.⁵ .................. G01C 22/00; G06F 15/50
[52] U.S. Cl. ................................. 364/569; 364/561; 364/426.04; 324/178
[58] Field of Search ............... 364/550, 556, 561, 569, 364/426.04, 442, 443, 444, 565, 424.05, 431.1, 431.11; 340/441, 446, 936; 235/615; 73/718, 719; 324/178, 160, 161; 200/332, 61.44, 61.49, 47

[56] References Cited

U.S. PATENT DOCUMENTS

| | | | |
|---|---|---|---|
| 3,708,750 | 1/1973 | Bucks et al. | 324/178 |
| 3,710,246 | 1/1973 | Herring | 324/162 |
| 3,748,580 | 7/1973 | Stevens et al. | 324/178 |
| 3,846,701 | 11/1974 | Samprey | 324/178 |
| 4,223,297 | 9/1980 | Nomura et al. | 340/441 |
| 4,285,041 | 8/1981 | Smith | 364/569 |
| 4,295,017 | 10/1981 | Kashima et al. | 200/47 |
| 4,485,452 | 11/1984 | Cording et al. | 364/565 |
| 4,569,027 | 2/1986 | Nakano et al. | 364/565 |
| 4,596,215 | 6/1986 | Palesotti | 123/350 |
| 4,647,901 | 3/1987 | Teshima et al. | 340/441 |
| 4,677,556 | 6/1987 | Habu | 364/442 |
| 4,695,958 | 9/1987 | Mackenroth | 364/561 |
| 4,740,905 | 4/1988 | Murakami et al. | 364/561 |
| 4,814,564 | 3/1989 | Ritter | 200/61.49 |

Primary Examiner—Parshotam S. Lall
Assistant Examiner—Michael Zanelli
Attorney, Agent, or Firm—Daniel J. Hudak, Co.

[57] ABSTRACT

An apparatus for automatically and continuously projecting an elapsed time in which a vehicle traveling over a racecourse will complete the course, wherein a difference between the projected elapsed time and a predicted time is continuously displayed to a driver of the vehicle, so that the driver can adjust the speed of the vehicle as needed during a race to approximate the predicted time. A plurality of magnets are mounted on a drive shaft of the vehicle in a circumferentially spaced relationship. A pickup coil is mounted adjacent to the magnets to detect movement of the magnets past the coil for measuring the distance traveled by the vehicle. A computer is electrically connected to the pickup coil and collects data from the coil for continuously calculating a difference between the projected elapsed time and the predicted time during a race. A motion switch is electrically connected to the computer and detects forward movement of the vehicle at the start of a race for automatically actuating the computer. A light gage is electrically connected to the computer and includes a set of red lights and a set of green lights which, when illuminated, indicate that the projected elapsed time is faster or slower, respectively, than the predicted time in 0.01 second increments. When one or more of the red or green lights are illuminated, the driver can decrease or increase the speed of the vehicle, respectively, so that the elapsed time approximates the predicted time at the end of a race.

7 Claims, 2 Drawing Sheets

DRAG RACE ANALYZER

BACKGROUND OF THE INVENTION

1. Technical Field

The invention relates to analyzing apparatus and in particular to a drag race analyzing apparatus. More particularly, the invention relates to such a drag race analyzing apparatus which automatically and continuously projects an elapsed time in which a vehicle traveling over a racecourse will complete the course, and continuously displays to a driver of the vehicle during a race a difference between the projected elapsed time and a predicted time for the vehicle to complete the course, so that the driver can adjust the speed of the vehicle as needed to approximate the predicted time.

2. Background Information

Bracket-style auto drag racing is a type of drag racing in which the object for the drivers of the competing cars is to complete the racecourse ahead of his/her opponent without having an elapsed time for the race which is faster than the time predicted by the driver before the race. If one of the drivers finishes with an elapsed time faster than his/her predicted time, then that driver has "broken out" and loses the race regardless of his/her finish with respect to the opponent. If both cars happen to break out and finish the race with elapsed times faster than their predicted times, then the driver breaking out the least wins the race, regardless of who crosses the finish line first.

Such drag races typically last only approximately 5–20 seconds and are timed to an accuracy of 0.001 second. Thus, it is extremely difficult if not impossible for a driver, while concentrating on the mechanics of racing the car and the position of the opponent, to discern whether the car is running faster or slower than the predicted time, and by how much.

The closest known prior art to the present invention includes various devices which measure and store data during a race for review after the race, but which do not assist a driver during a race as does my drag race analyzer.

Therefore, the need exists for a drag race analyzing apparatus which automatically and continuously indicates to a driver of a vehicle during a race whether his/her projected elapsed time is faster or slower than a predicted time for completing a racecourse, along with the magnitude of any such difference, so that the driver can adjust the speed of the vehicle accordingly during the race to approximate the predicted time.

SUMMARY OF THE INVENTION

Objectives of the drag race analyzer of the present invention include providing an apparatus which automatically and continuously calculates and indicates to a driver of a drag racing vehicle during a race whether his/her projected elapsed time is faster or slower than a driver-predicted time for completing a racecourse, and which further indicates the magnitude of any such deviation from the predicted time, so that the driver can adjust the speed of the vehicle accordingly during the race to approximate the predicted time.

Another objective of the invention is to provide such a drag race analyzer in which a difference between the projected elapsed time and the predicted time, together with the magnitude thereof, is displayed in a visually perceptible form which is quickly recognizable by the driver of the vehicle, and which enables the driver to react quickly in adjusting the speed of the vehicle for approximating the predicted time.

A further objective of the invention is to provide such a drag race analyzer which collects and stores various data measured during the race for post-race display and/or printout for analysis thereof.

Still another objective of the invention is to provide such a drag race analyzer which accounts for variables such as differences in racecourse length, vehicles, lane rollouts, track timing equipment, weather conditions, etc.

A still further objective of the invention is to provide such a drag race analyzer which is extremely accurate, and which will improve the consistency of performance of a given vehicle-driver combination.

Another objective of the invention is to provide such a drag race analyzer which is relatively inexpensive to purchase and install, simple to operate, low-maintenance, and durable in use.

These objectives and advantages are obtained by the apparatus of the invention for automatically and continuously projecting an elapsed time in which a vehicle traveling over a course of a certain distance will complete the course, and continuously displaying to a driver of the vehicle during a race, a difference between the projected elapsed time and the predicted time for the vehicle to complete the course, so that the driver can adjust a speed of the vehicle accordingly for approximating the predicted time, with the general nature of the invention being stated as including, measurement means for measuring the distance traveled by the vehicle over the racecourse; indicator means for indicating a difference between the projected elapsed time and the predicted time; detector means for detecting movement of the vehicle; and a computer electrically connected to the measurement means, the indicator means and the detector means, whereby the detector means automatically actuates the computer upon detecting movement of the vehicle, and the computer collects data from the measurement means and continuously calculates a difference between the projected elapsed time and the predicted time, so that the difference is indicated to the driver of the vehicle by the indicator means.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
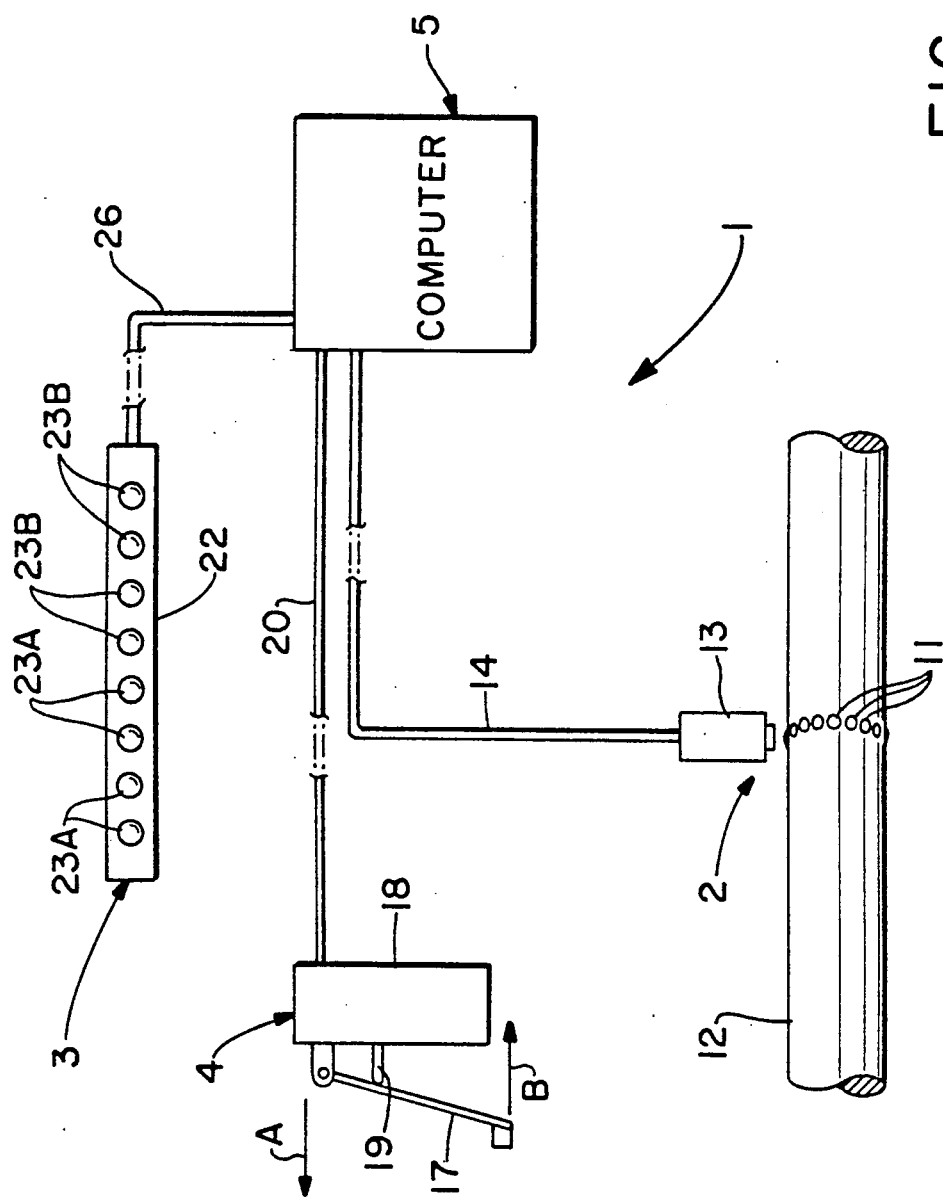
FIG. 1 is a schematic view of the drag race analyzer of the present invention.
Figure 3:
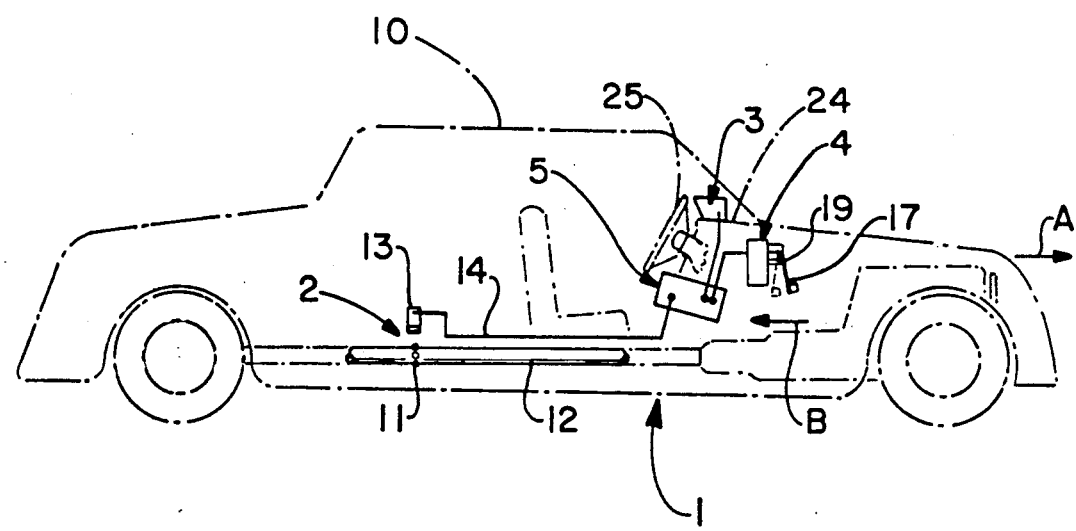
FIG. 3 is a diagrammatic side view of the automobile, with portions broken away, showing the arrangement of the various components of the drag race analyzer apparatus therein.

The drag race analyzer apparatus of the present invention is indicated generally at 1, is shown diagrammatically in FIG. 1, and is shown in its intended use in combination with an automobile 10 in FIG. 3. Race analyzer 1 comprises a distance measuring device, a light gage, a motion switch, and a computer, indicated generally at 2, 3, 4 and 5, respectively.

Distance measuring device 2 (FIG. 1) comprises a plurality of magnets 11 mounted on a drive shaft 12 of an automobile 10 in an equally circumferentially spaced relationship. A pickup coil 13 of a type well-known in the art, is mounted on automobile 10 adjacent to magnets 11 for detecting movement of the magnets past the coil when drive shaft 12 is rotating, for measuring the distance traveled by the vehicle. The large number of magnets 11 provides resolution to the distance measurements taken by device 2. Pickup coil 13 is electrically connected to computer 5 by electrical circuit 14. It is understood that magnets 11 could be attached to another movable member of car 10, such as a wheel, without affecting the concept of the invention.

Motion switch 4 (FIG. 1) is of a type such as manufactured by Micro-Switch of Freeport, Illinois, a division of Honeywell, and identified by Part No. BZ-2RW80-A2. Switch 4 includes an actuating arm 17 pivotally suspended from a housing 18 having a limit switch plunger 19 extending outwardly therefrom. When actuated by arm 17, limit switch plunger 19 sends an electrical signal to computer 5 through an electrical circuit 20 which electrically connects motion switch 4 to the computer. When car 10 is motionless, actuating arm 17 remains generally vertically suspended from housing 18 as shown in full lines in FIGS. 1 and 3. However, when car 10 begins to move in a forward direction, as indicated by arrow A in FIGS. 1 and 3, arm 17 swings rearwardly in the direction of arrow B, which is opposite to the direction of arrow A, and actuates plunger 19, as shown in dot-dash lines in FIG. 3, for sending an electrical signal to computer 5. This signal causes the computer to begin measuring, calculating and storing data, as will be described in greater detail below in the description of the operation of race analyzer 1.

Figure 2:
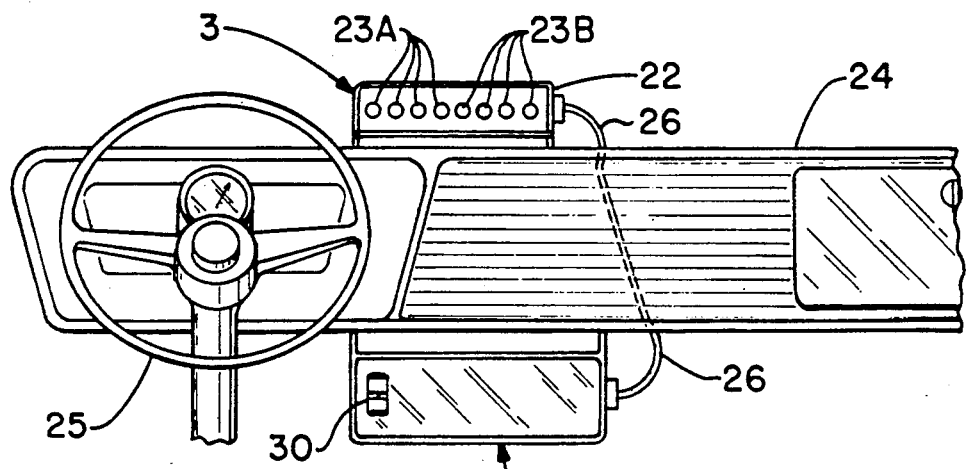
FIG. 2 is a fragmentary front view of the dash board of a drag racing automobile, showing the light gage and the computer of the apparatus of the invention mounted thereon.

Light gage 3 (FIGS. 1 and 2) includes a housing 22 having a plurality of LED lights 23A and 23B mounted therein. Lights 23A of gage 3 are green and lights 23B are red, the function of which is described in detail below. Light gage 3 preferably is mounted on a dashboard 24 of car 10 near steering wheel 25 of the car for convenient viewing by a driver, and is electrically connected to computer 5 by an electrical circuit 26.

Computer 5 preferably is mounted on or beneath dashboard 24 of car 10 so that it can be easily accessed by the driver of the car for operation of race analyzer 1.

Drag race analyzer 1 of the present invention is operated in the manner set forth below. Race analyzer 1 initially must be programmed for use in the particular car in which it is installed and for the particular track or racecourse on which the car will be running, since the diameter of the tires of the car and its acceleration rate, as well as the length of the track, are variables which the computer program used with analyzer 1 must account for in order to provide the desired results. It is to be understood that other computer programs could be devised by those skilled in the programming art for use with the present invention to achieve the desired results.

Thus, a time trial is made on the particular track on which a drag race is to be run, and the elapsed time for the trial and the length of the track are entered into the computer. Analyzer 1 automatically calculates the distance corresponding to each drive shaft magnet pulse picked up by coil 13, as well as the total number of pulses for the entire length of the track. The computer then calculates the number of drive shaft pulses per 0.01 second as well as per 0.1 second and stores the same in a calibration table.

Prior to a drag race, a predicted time in which the driver believes he/she can complete the racecourse without going faster than such time, and still finish ahead of the competitor, is entered into the computer. Immediately prior to "staging" the car, that is, moving the car to the starting line, a switch 30 (FIG. 2) of computer 5 is manually actuated and the computer thereby is activated to receive a signal through electrical circuit 20 that limit switch plunger 19 has been actuated by arm 17 due to the forward movement of the car in the direction of arrow A. However, the computer does not begin measuring, calculating and storing data until plunger 19 is actuated and a continuous string of magnetic pulses are picked up from drive shaft 12. More particularly, if magnetic pulses are absent for more than 0.1 second, the computer resets until plunger 19 again is actuated. Thus, the car can be staged or moved to the starting line without causing the computer to begin measuring and calculating data and storing the same.

Prior to the start of the race, the computer also takes the data stored in the calibration table, which represents the time trial as discussed above, and modifies the time trial calibration table and produces another table which represents the predicted time entered into the computer before the race. After the start of the race, the computer continuously compares the number of drive shaft counts at 0.1 second intervals with the data stored in the predicted time table for continuously projecting the elapsed time in which the vehicle will complete the racecourse if it continues to perform as expected with respect to the predicted time table. Any deviation in the projected elapsed time of the run from the predicted time is converted into 0.01 second increments and displayed on the light gage.

Each of the green lights 23A, when illuminated, represents a 0.01 second increment to indicate how much slower the car is running than the predicted time. Similarly, each of the illuminated red lights 23B also represents a 0.01 second increment to indicate how much faster the car is running than the predicted time. Thus, for example, if two red lights are illuminated, the projected elapsed time of the car is 0.02 second faster than the predicted time, and the driver must slow down or risk breaking out and possibly losing the race. If three green lights are illuminated, the projected elapsed time of the car is 0.03 second slower than the predicted time, and the driver can speed up, if necessary, to cross the finish line ahead of the opponent. If the two centermost adjacent green and red lights of the light gage both are illuminated, it means that the projected elapsed time of the run is exactly the same as the predicted time, so the driver should maintain his speed. When the car crosses the finish line, the light gage "freezes" so that the driver can see how close the elapsed time was to the predicted time at the end of the race. Freezing of the light gage as the car crosses the finish line is accomplished by the computer, which stores the value of the known distance of the race track and then measures the distance traveled by the car during a race via measuring device 2. When the car has traveled the same distance as the known stored distance, that is, crosses the finish line, the computer freezes the light gage.

Race analyzer 1 also measures, calculates and stores other pertinent data from each run, such as the total elapsed time for the run and the elapsed time at selected intervals during the run, miles per hour, etc. Such data can be analyzed after a race, if desired, either via display on a usual CRT screen or by a printout produced by a usual printer, which can be electrically connected to the computer either in the car or in a home after removal of the computer from the car. Alternatively, the disc or other computer data storage device can be removed from the car computer after a race and used with a computer in the home having a CRT and/or printer. Such further analysis of race data can assist the driver in choosing a predicted time in subsequent races.

Thus, it can be seen that analyzer 1 is accurate to 0.01 second, which will improve the consistency of performance of a given car-driver combination and eliminate guessing by the driver during a race as to whether his car is running faster or slower than a predicted time.

It is understood that drag race analyzer 1 could be installed in other racing vehicles such as motorcycles, without effecting the concept of the invention. In addition, indicator devices other than light gage 3 could be used to alert the driver to a deviation between the projected elapsed time and the predicted time, such as an audible signal-producing device, digital LED displays, meters, etc. Also, the light gage could be programmable so that the time increments represented by each light could be varied depending on the requirements of a particular driver.

Again, the main feature of the present invention is the arrangement of components which automatically and continuously measure and calculate the difference between the projected elapsed time of a car during a drag race and the predicted time for completing the race, into 0.01 second increments displayed on an easy-to-read, dual-colored light gage, which enables a driver to instantaneously discern whether he must speed up or slow down to approximate the predicted time.

Another important feature of the invention is the use of a computer which, in addition to calculating any deviation between the projected elapsed time and the predicted time, stores other pertinent race information which can be displayed on a screen or printed out after a race for analyzing the race and aiding in determining predicted times for subsequent races.

In summary, the drag race analyzer apparatus is relatively inexpensive to purchase and install, easy to operate, requires little maintenance, is extremely accurate and durable in use, and most importantly aids the driver during a race unlike many prior art analyzing devices which translates into consistent performance by a given car-driver combination.

Accordingly, the drag race analyzer of the present invention is simplified, provides an effective, safe, inexpensive, and efficient apparatus which achieves all the enumerated objectives, provides for eliminating difficulties encountered with prior apparatus, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the drag race analyzer is constructed and used, the characteristics of the apparatus, and the advantageous, new and useful results obtained; the new and useful structures, devices, elements, arrangements, parts and combinations, are set forth in the appended claims.

I claim:

1. An apparatus for automatically and continuously projecting an elapsed time in which a vehicle traveling over a course of a certain distance will complete the course, and for continuously displaying to a driver of the vehicle during a race a difference between the projected elapsed time and a predicted time for the vehicle to complete the course, so that the driver can adjust a speed of the vehicle accordingly for approximating the predicted time, said apparatus including:
 a) measurement means for measuring the distance traveled by the vehicle over the course;
 b) indicator means for indicating a difference between the projected elapsed time and the predicted time;
 c) a motion switch comprising an actuating arm for actuating a limit switch plunger when the vehicle moves in a forward direction; and
 d) a computer electrically connected to the measurement means, the indicator means and the motion switch, whereby the actuation of the limit switch plunger of said motion switch sends an electrical signal to the computer for automatically actuating the computer upon movement of the vehicle in a forward direction, and wherein said actuated computer collects distance data from the measurement means and correlates said distance data to predetermined time intervals, continuously compares said distance and time data to predicted distance and time data previously stored in a calibration table in the computer based on a trial run of the vehicle over the course, to generate the projected elapsed time for the vehicle to complete the course, and further continuously calculates a difference between the projected elapsed time and the predicted time, so that said difference is indicated to the driver of the vehicle by the indicator means.

2. The apparatus defined in claim 1 in which the measurement means in a source mounted on a movable member of the vehicle and a sensor mounted adjacent to the source for detecting movement of said source.

3. The apparatus defined in claim 2 in which the source is a plurality of magnets mounted on a drive shaft of the vehicle in an equally circumferentially spaced relationship; and in which the sensor is a pickup coil mounted adjacent to the drive shaft magnets for detecting movement of said magnets past the coil.

4. The apparatus defined in claim 1 in which the indicator means is a light gage positioned on the vehicle in view of the driver of said vehicle; in which the light gage includes at least a pair of lights; in which a certain one of the pair of lights indicates that the projected elapsed time is faster than the predicted time when said certain one of the lights is illuminated; and in which the other of the pair of lights indicates that the projected elapsed time is slower than the predicted time when said other of the lights is illuminated.

5. The apparatus defined in claim 1 in which the indicator means is a light gage mounted within a passenger compartment of the vehicle; in which the light gage includes a plurality of lights; in which the plurality of lights comprise a first set of lights and a second set of lights; in which each of the lights of the first set indicates that the projected elapsed time is faster than the predicted time by a predetermined amount of time when one or more of said first set of lights are illuminated; and in which each of the lights of the second set indicates that the projected elapsed time is slower than the predicted time by the predetermined amount when one or more of said second set of lights are illuminated.

6. The apparatus defined in claim 5 in which the first set of lights are a generally red color and the second set of lights are a generally green color; and in which the predetermined amount of time indicated by each of the plurality of lights is 0.01 second.

7. The apparatus defined in claim 1 in which the computer is mounted within a passenger compartment of the vehicle within reach of the driver of said vehicle.

* * * * *